Figure 1:
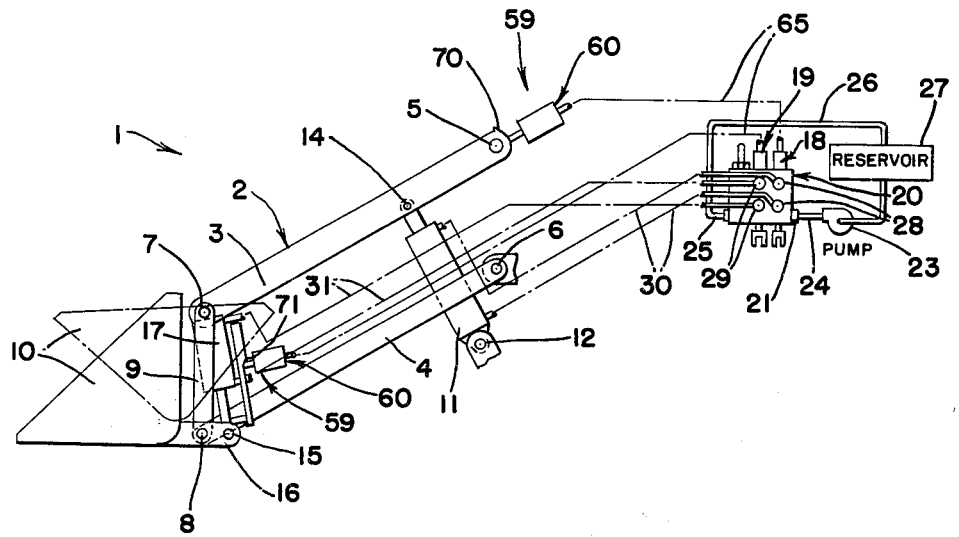

May 7, 1963 H. J. STACEY 3,088,489
DETENT RELEASE FOR FLOW CONTROL VALVES
Filed Aug. 22, 1960 3 Sheets-Sheet 1

INVENTOR.
HUGH J. STACEY
BY
Oberlin, Maky & Donnelly
ATTORNEYS

*INVENTOR.*
HUGH J. STACEY
BY
Oberlin, Maky & Donnelly
ATTORNEYS

May 7, 1963

H. J. STACEY 3,088,489

DETENT RELEASE FOR FLOW CONTROL VALVES

Filed Aug. 22, 1960

3 Sheets-Sheet 3

INVENTOR.
HUGH J. STACEY
BY
Oberlin, Maky & Donnelly
ATTORNEYS

United States Patent Office
3,088,489
Patented May 7, 1963

3,088,489
DETENT RELEASE FOR FLOW CONTROL VALVES
Hugh J. Stacey, Chesterland, Ohio, assignor to Parker-Hannifin Corporation, Cleveland, Ohio, a corporation of Ohio
Filed Aug. 22, 1960, Ser. No. 51,080
4 Claims. (Cl. 137—622.5)

The present invention relates generally as indicated to a detent release for flow control valves and, more particularly, to an automatic release mechanism which is fluid actuated by a remote sensing element.

In the field of hoisting, excavating and like equipment, i.e. cranes, power shovels, hoes, front end loaders, graders, bulldozers, etc., it is a prevalent practice to employ hydraulic cylinders for actuating the booms, buckets, scoops, and like components thereof and to employ banks of flow control valves readily accessible to the operator for controlling actuation of such hydraulic cylinders. It is also common practice to provide such flow control valves with detents so that the valve members may be moved to desired active positions and yieldably held thereat so as to free the operator's hands for performing other operations of the equipment. However, in known control valves having such detent mechanisms it has been necessary, after conclusion of the desired operation, for the operator to manually release the thus activated valve member from its detent for return to neutral or inactive position. Otherwise, the hydraulic pump continues to operate under great load thereby needlessly consuming power and causing excessive heating of the oil as it is circulated through the hydraulic system under high pressure, with possible foaming of the oil and damage to packings and other components of the system.

Accordingly, it is a principal object of this invention to provide a detent release for a control valve of the character referred to which is operative automatically to release the control valve member from active position when the desired function thereof has been concluded, whereby the control valve member is free to return to its neutral or inactive position whereat free circulation of the fluid through the system is permitted while the associated hydraulic cylinder is held in the desired position by the blocking of fluid communication between the service ports of the control valve and the pressure inlet and return ports thereof.

It is another object of this invention to provide a detent release for a flow control valve of the character indicated in which the detent release is actuated by fluid under pressure that is developed in a confined body of fluid through the actuation of a remote sensing element either by the cylinder under control or its associated component.

It is another object of this invention to provide a detent release for a flow control valve of the character indicated in which there is provided a separate hydraulic system (a confined body of fluid) and the detent release is actuated by fluid pressure developed in said body of fluid by a sensing element that is mechanically actuated by the component under control.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 2:
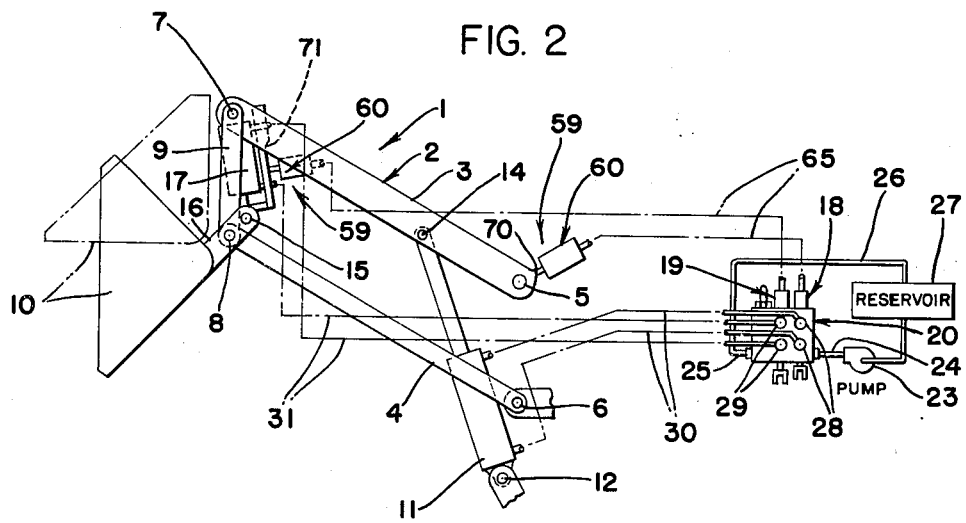
Figure 3:
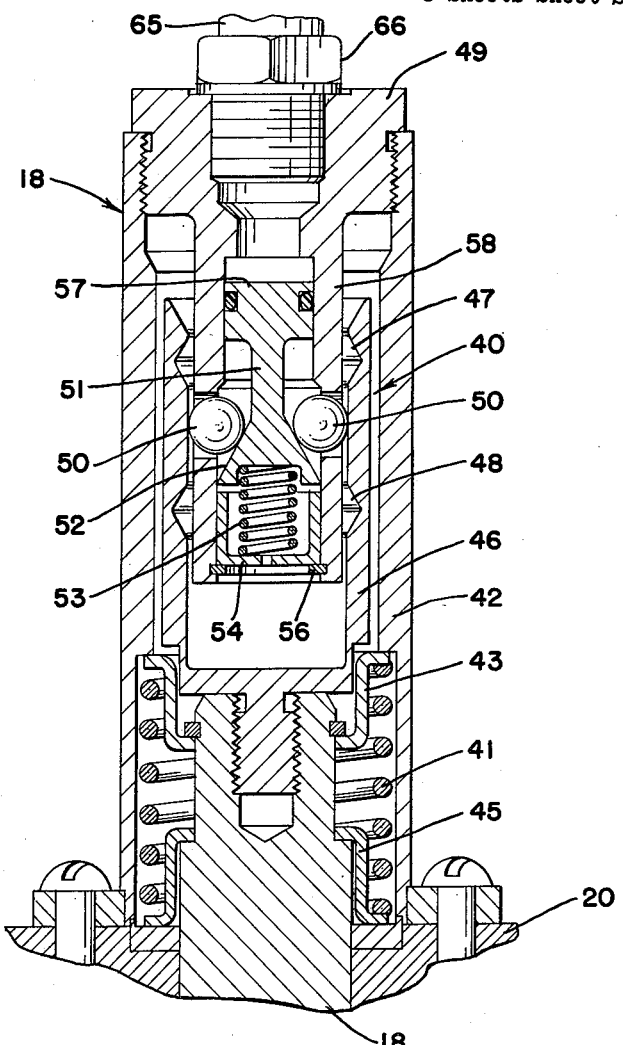
Figure 4:
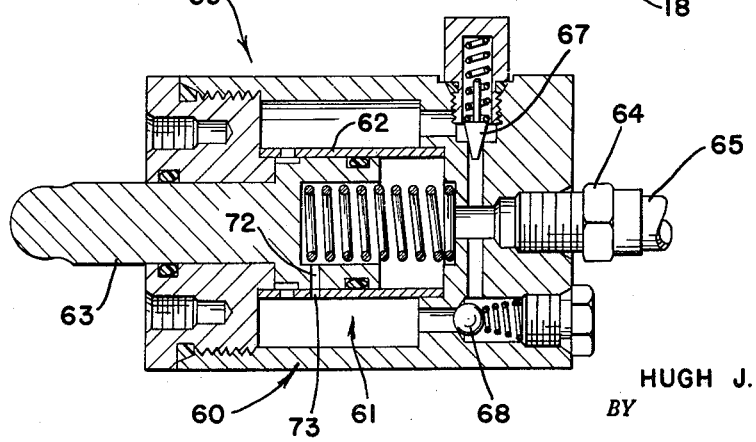
Figure 5:
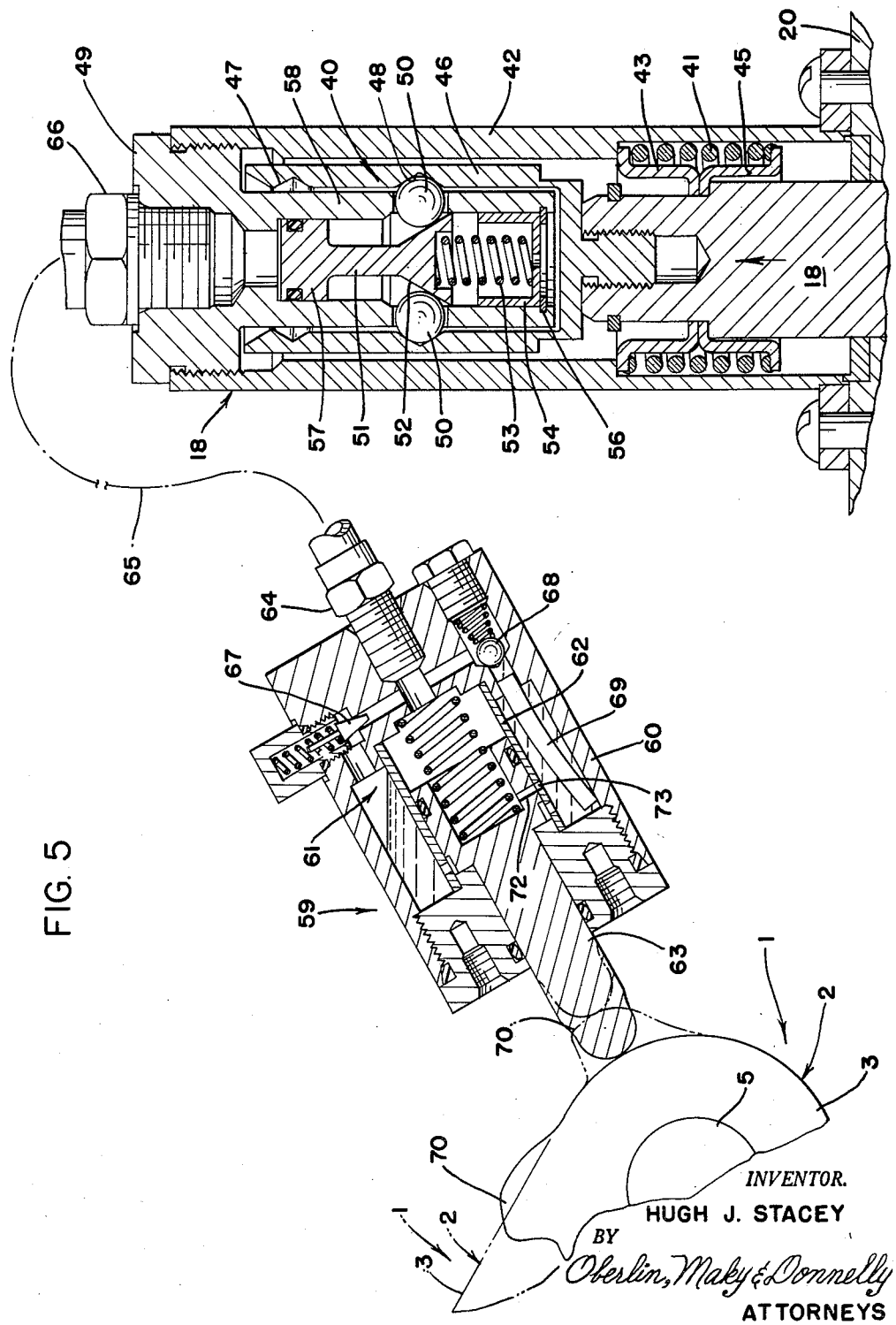

In said annexed drawings:
FIG. 1 is a diagrammatic view of a front end loader or the like, which employs hydraulic cylinders for respectively actuating the boom and bucket thereof, corresponding boom and bucket control valves, and corresponding detent release mechanisms for said control valves actuated by the boom and bucket respectively, the boom and bucket being shown in positions for digging, scooping, or thrusting into material to be lifted with the detent of the bucket control valve released by its detent release;
FIG. 2 is a diagrammatic view similar to FIG. 1 except showing the boom and the bucket in load dumping position, the detent release of the boom control valve having been actuated to release its detent mechanism;
FIG. 3 is a fragmentary cross-section view showing a preferred form of detent mechanism employed in each of the control valves of FIGS. 1 and 2;
FIG. 4 is a cross-section view of one of the sensing elements that are adapted to be remotely mounted for actuation by the respective cylinders or their movable components; and
FIG. 5 shows how the sensing element and the detent mechanism are operatively connected together for release of the detent mechanism of the associated control valve member when the sensing element is actuated as by the component of the equipment with which it is associated.

Referring now in detail to the drawings, and first to FIGS. 1 and 2, there is shown therein (for sake of illustration only) a front end loader 1 or the like, which comprises a boom assembly 2 including generally parallel arms 3 and 4 which have their rear ends pivotally connected as at 5 and 6 to brackets or the like provided on the tractor (not shown). The front ends of the arms 3 and 4 are pivotally connected as at 7 and 8 to the upwardly extending arm 9 of the bucket or scoop 10. In this way the boom arms 3 and 4 and the pivots 5, 6, 7, and 8 form a generally parallelogram linkage effective as to maintain the bucket or scoop 10 in a load-dumping, load-pickup, or load-thrust positions in any position of the boom 2.

The boom 2 is arranged to be raised or lowered as by means of the double acting hydraulic cylinder assembly 11 which has its cylinder end pivotally mounted at 12 on the tractor and its rod end pivotally connected at 14 to the main boom arm 3.

Pivotally connected as at 7 and 15 to extend between the boom 2 and the rearwardly extending arm 16 of the scoop or bucket 10, is the double acting hydraulic cylinder assembly 17. It can be seen that when the bucket actuating cylinder 17 is retracted, the bucket 10 will be swung to dumping position (full line position of FIG. 2) to dump the load therefrom; when said cylinder 17 is extended, the bucket 10 will be tilted back to load-hoisting position (dot-dash line position of FIG. 1) so that a load therein may be lifted from the ground for dumping into a truck or the like, after the boom has been raised and when the cylinder 17 is in an in-between position, the scoop 10 will be in position for thrust into a load to be hoisted (solid line position of FIG. 1 and dot-dash line position of FIG. 2).

In equipment of this nature there will be provided boom and bucket control valves 18 and 19 for the respective cylinders 11 and 17 and in this case, again by way of illustration only, both control valves 18 and 19 may comprise spool valves mounted in a unitary housing 20. Herein, the housing 20 is formed with a pressure inlet port 21 to which the discharge port of the hydraulic pump 23 is connected by conduit 24. The housing 20 is also formed with a return port 25 through which fluid is returned by way of the conduit 26 to the reservoir 27. Usually, in a bank of control valves, as herein shown, when both control valves are in neutral or inactive position blocking the respective pairs of service ports 28; 28 and 29; 29 of valve 18 and 19 there will be defined in the housing 20 a bypass whereby the fluid delivered by the pump 23 is freely circulated through the housing 20 to the reservoir 27 via conduit 26.

The service ports 28; 28 of boom control valve 18 are connected by conduits 30; 30 to the opposite ends of the boom actuating cylinder 11, and the service ports 29; 29 of bucket control valve 19 are similarly connected by conduits 31; 31 to the ends of the bucket actuating cylinder 17. Accordingly, when the control valves 18 and 19 are of the four-way type, movement of the respective control valves in one direction from neutral communicates one of its service ports with the pressure inlet port 21 and the other of its service ports with the tank or return port 25 whereby the respective cylinders 11 and 17 will be actuated in one direction. When the respective control valves are shifted in the opposite direction from neutral position, the relation of the service ports to the inlet and return ports is reversed so that the respective cylinders will be actuated in the opposite direction. Thus, when it is desired to raise the boom 2, the boom control valve 18 may be moved upwardly as viewed in FIGS. 1 and 2 to cause fluid under pressure to flow through the bottom conduit 30 into the head end of the boom actuating cylinder 11, the fluid displaced from the rod end of the cylinder 11 being returned to the reservoir 27 by way of the upper conduit 30. On the other hand, if the boom control valve 18 is of the four-way type to provide for controlled lowering of the boom 2 under load, the movement of the control valve 18 downwardly from neutral position will cause retraction of the boom cylinder 11.

Similarly, when the bucket control valve 19 is shifted in opposite directions from neutral position, the bucket actuating cylinder 17 will be either extended or retracted, and when extended, the bucket 10 will be tilted back to retain a load therein for hoisting and when fully retracted, the bucket 10 will be tipped to dump the contents thereof. In equipment of the nature herein disclosed it is desired, after dumping the load from bucket 10, to position the bucket in digging or thrust position (solid line position of FIG. 1) for thrusting into material to be lifted.

In ordinary four-way type control valves, and as previously mentioned, the neutral or inactive position thereof blocks the respective pairs of service ports so that fluid is trapped in both ends of the respective cylinders to retain the boom 2 or bucket 10 in a selected position. When two or more such control valves are employed it is also customary to provide a common bypass through the housing 20 which permits free circulation of the oil delivered by the pump 23 to reservoir 27 when the control valves are in neutral position.

In equipment of this nature it is often desired to provide in association with each control valve, a detent mechanism which yieldably retains it in an operating position, so that the operator of the equipment may simply shift the control valves to a selected position and thereafter use his hands for other purposes while the detent mechanisms yieldably hold the control valves in the selected operating positions.

However, in the usual detent mechanism the operator must remember to manually release the control valves for shifting them to neutral or inactive positions once the desired functions have been completed. Therefore, should the operator be inattentive, leaving the control valves in active, operating positions, the pump will be called upon to operate continuously under high load since the bypass through the valves will be blocked whereby considerable power will be wasted and, moreover, the oil in the hydraulic system is apt to become highly heated.

Another feature of control valves of the type herein disclosed is that they are usually provided with so-called "load checks" which are ordinary check valves operative to prevent interflow of oil between a plurality of cylinders when the cylinders are simultaneously being operated under different load conditions.

Referring now to FIGS. 3, 4, and 5, there is shown in FIG. 3, a preferred form of detent mechanism 40 adapted to be used with each of the spool valves 18 and 19 herein, the spool 18 (or 19) being shown in its mid or neutral inactive position in which it is yieldably held by the spring 41 which is compressed between the detent housing 42 and valve housing 20. As evident, when the spool 18 is moved downwardly as viewed in FIG. 3, the spring follower 43 will move therewith to additionally compress the spring 41, whereby the spring will normally tend to return the spool 18 to the mid-position shown. On the other hand, when the spool 18 is moved upwardly from mid-position the other spring follower 45 will move therewith to additionally compress the spring 41, whereby the spring will likewise tend to constantly urge the spool 18 back to its mid-position.

Screwed into the upper end of the spool 18 is a tubular detent body 46 which is formed with axially spaced apart internal grooves 47 and 48 which correspond in spacing to the two operating positions of the spool 18 on either side of the mid-position.

Secured as by a screw-threaded connection to the upper end of the detent housing 42 is a detent carrier 49 which is formed with radial openings for the detent balls 50 or the like, these balls 50 being disposed midway between the grooves 47 and 48 of the detent body 46 when the spool 18 is in neutral or mid-position.

The detents 50 are yieldably urged radially outward by means of the spring-actuated cam member 51 which has a frusto-conical cam surface 52 disposed within the detent carrier 49 and within the detents 50. The spring 53 for actuating the cam member 51 is backed up as by the plug 54 retained in the detent carrier 49 by the snap ring 56.

From the description thus far, it is evident that when the spool 18 is moved upwardly to position the lower groove 48 opposite the detents 50 the spring 53 acting on the cam member 51 will force the detents 50 outwardly into engagement with groove 48, such engagement being of sufficient magnitude to retain the spool 18 in its upper position despite the disengaging influence of the spool return spring 41. Similarly, when the spool 18 is moved downwardly from the FIG. 3 position the upper groove 47 will be opposite the detents 50, whereupon the spring 53 will, through the cam member 51, force the detents 50 into groove 47 to retain the spool 18 in its lower active position despite the influence of the spool return spring 41. Without more, it would be necessary for the operator of the equipment to manually shift the spool 18 from either operating position to disengage the detents 50 from groove 47 or 48, whereupon the spool centering spring 41 will then continue the movement of the spool to neutral position.

In the present case, the cam member 51 is formed with a piston portion 57 which is slidably sealed in the cylinder portion 58 of the detent carrier 49 and thus it can be seen that fluid under pressure acting on the upper end of the piston portion 57 can be used to force the cam member 51 downwardly to compress the detent spring 53 so that the detents 50 will be free to be cammed inward by the inclined wall of groove 47 or 48 through the influence of the spool return spring 41, whereby whenever the cam member 51 is so moved, the spool 18 will be released for return to neutral or mid-position.

As best shown in FIGS. 4 and 5, the sensing or actuating element 59 for the cam member 51 comprises a body 60 formed with a fluid reservoir 61 and with a cylinder 62 in which a cam-actuated, spring return piston 63 is reciprocable. The body 60 is also formed with an outlet port 64 which is adapted to be connected as by means of the conduit 65 to the port 66 of the detent carrier 49. Between the cylinder 62 and the reservoir 61 there is provided a suitable relief valve 67 to prevent build-up of excessive fluid pressure in this detent release circuit. Also there is provided a make-up check valve 68 which permits drawing of fluid from the reservoir 61 into the cylinder 62. It is to be understood that a sump tube 69 (see FIG. 5) will be employed in reservoir 61 to insure that the check valve inlet is below the fluid level in reservoir 61 in tilted and vertical positions of element 59.

The sensing element 59 aforesaid, in the case of the boom control circuit may be adjustably mounted on a convenient place of the tractor so that the cam 70 on the boom 2 will move the piston 63 in cylinder 62 at the proper time. In the case of the bucket actuating cylinder 17, the sensing element 59 may be mounted in adjusted position on the tractor and said actuating cylinder 17 may be provided with a cam 71 for actuating the piston 63 in cylinder 62 at the proper time.

When the respective pistons 63 of the sensing elements 59 are actuated by the respective cams 70 and 71, as the case may be, fluid will be displaced from the respective cylinders 62 into the respective detent release cylinders 58 to force the respective cam members 51 in a direction releasing the respective detents 50 from the respective detent grooves 47 or 48 of the control valves 18 and 19.

Thus, in the case of the detent release mechanism associated with the boom control valve 18, let us assume that the operator desires to raise the boom 2. Thus, he will shift the control valve 18 to "Boon Hoist" position, whereat it will be held by the associated detent, the fluid displaced by the cam member 51, as it moves in the cylinder portion 58 of carrier 49 to urge the detents 50 into groove 48, being returned to the reservoir 61 via the now registering bleed holes 72 and 73 formed in the wall of piston 63 and cylinder 62 respectively. The operator need not pay any further attention to the boom-raising operation since, when the boom 2 has been raised, the cam 70 thereof will have forced the sensing element piston 63 inward of body 60 first to move the bleed holes 72 and 73 out of register with each other and thereafter to displace fluid through conduit 65 and thereby shift the detent cam member 51 in a direction to release the detents 50 from the control valve 18, whereupon the centering spring 41 will return the valve 18 to neutral position. Likewise, assuming that the bucket 10 is in dumping position as shown in solid lines in FIG. 2, that is, with the cylinder 17 in retracted position, and the operator desires to automatically actuate the bucket 10 to the digging or thrust position shown in solid lines in FIG. 1, all that he has to do is to actuate the control valve 19 in the proper direction, whereupon the valve 19 will be yieldably retained in that position by the associated detent mechanism 40, but when the bucket 10 reaches the desired position, the cam 71 will press in the piston 63 of the sensing element 59 to thereby displace fluid into the detent cylinder 58 to cause shifting of cam member 51 and consequent release of the detents 50 for return of the control valve 19 to neutral position under the influence of the return spring 41. When the bucket 10 is to be tilted back (dotted line position in FIG. 1) the operator will then operate the control valve 19 in the same direction as before but he will have to hold the valve 19 until the bucket 10 reaches the tilted load-carrying position since the detent mechanism 40 remains in releasing position during the balance of the stroke of the cylinder 17.

While, in the embodiment of the invention herein disclosed each release circuit has associated therewith only one cam 70 or 71 for releasing the associated control valve 18 or 19 from but one of its operating positions, it is to be understood that similar cams may be provided to release the respective valves from the other operating positions.

Other modes of applying the principle of the invention may be employed, change being made as regards the details described, provided the features stated in any of the following claims, or the equivalent of such, be employed.

I therefore particularly point out and distinctly claim as my invention:

1. In combination; a fluid motor and a fluid pressure supply source therefor; a control valve between said source and motor having a valve member therein which is spring-biased to an inactive position blocking fluid communication between said source and motor, and which is movable to an active position permitting flow of fluid from said source to said motor for actuating the latter; a detent mechanism in said valve effective to hold said valve member in active position in opposition to such spring-bias, said detent mechanism comprising complementary interengaged detent-recess means and a fluid pressure actuated cam for holding said detent-recess means in interengagement; and a detent release rendered effective, upon predetermined actuation of said motor, to release said valve member for automatic spring biased return to inactive position; said detent release comprising a movable plunger, a confined body of fluid between said plunger and cam whereby movement of said plunger develops fluid pressure in such body of fluid that actuates said cam to permit disengagement of said detent-recess means and consequent spring biasing of said valve member to inactive position, and a cam actuated by said motor effective to engage said movable plunger upon such predetermined actuation of said motor.

2. The combination of claim 1 wherein said detent release has a reservoir for fluid associated therewith which is in fluid communication with such body of fluid through a check valve and a relief valve respectively to maintain a prescribed volume of fluid in such body and to limit the pressure built up in such body during movement of said movable plunger by the cam actuated by said motor.

3. The combination of claim 1 wherein said detent release has a reservoir for fluid associated therewith which has bleed means in fluid communication with such confined body of fluid to permit movement of said fluid pressure actuated cam relative to said plunger for holding said detent-recess means in interengagement; and wherein the initial portion of the movement of said plunger by the cam actuated by said motor closes said bleed means.

4. The combination of claim 1 wherein said detent release has a reservoir for fluid associated therewith which is in fluid communication with such body of fluid through a check valve and a relief valve respectively to maintain a prescribed volume of fluid in such body and to limit the pressure built up in such body during movement of said movable plunger by the cam actuated by said motor; and wherein said reservoir has bleed means in fluid communication with such confined body of fluid to permit movement of said fluid pressure actuated cam relative to said plunger for holding said detent-recess means in interengagement; and wherein the initial portion of the movement of said plunger by the cam actuated by said motor closes said bleed means.

References Cited in the file of this patent

UNITED STATES PATENTS

| | | |
|---|---|---|
| 2,547,853 | Butterfield | Apr. 3, 1951 |
| 2,615,177 | Schlichting | Oct. 28, 1952 |
| 2,689,585 | Presnell | Sept. 21, 1954 |
| 2,848,014 | Tennis | Aug. 19, 1958 |
| 2,870,553 | Temple | Jan. 27, 1959 |
| 2,874,720 | Vahs | Feb. 24, 1959 |
| 2,921,602 | Brinkel | Jan. 19, 1960 |

FOREIGN PATENTS

| | | |
|---|---|---|
| 313,653 | Great Britain | June 17, 1929 |
| 465,888 | Italy | Sept. 29, 1951 |